United States Patent [19]

Riggs

[11] 3,772,922
[45] Nov. 20, 1973

[54] PHASE COMPENSATED MULTIPLE MOVING HEAD INSPECTION APPARATUS

[76] Inventor: Darius O. Riggs, Ottawa Lake, Mich.

[22] Filed: Dec. 17, 1971

[21] Appl. No.: 209,144

[52] U.S. Cl.................... 74/25, 226/112, 198/218
[51] Int. Cl............................................. F16h 21/16
[58] Field of Search..................... 198/33 AB, 218; 64/1 R; 74/25; 226/112; 141/178, 179

[56] References Cited
UNITED STATES PATENTS

| | | | |
|---|---|---|---|
| 3,142,185 | 7/1964 | Knowles | 74/25 |
| 3,549,072 | 12/1970 | Ito | 226/112 |
| 3,262,541 | 7/1966 | Gain | 198/218 |
| 3,655,310 | 4/1972 | Smith et al | 226/112 |

*Primary Examiner*—Charles J. Myhre
*Assistant Examiner*—Wesley S. Ratliff, Jr.
*Attorney*—D. T. Innis et al.

[57] ABSTRACT

Apparatus and method for driving three article inspection stations out of phase with one another for inspecting moving articles with a minimum expenditure of drive power. In this invention, three inspection station drive mechanisms are utilized. Each of the three drive mechanisms is an identical unit utilizing a cam to produce an oscillating output from an arm, the cam being driven by a continuously rotating input shaft. Each of the three units are coupled in series in a linear array and driven by a common drive motor. A split coupling is used to connect the three drive units together, allowing the phase of the cams contained within the unit to be set independently. The oscillating arms are set out of phase with each other by approximately 120°. The oscillating output arms drive article inspection stations on which are mounted inspection apparatus. The motion of the article inspection stations is such that, as articles are precessed past each station, the station tracks the article for a period of time at a constant velocity and inspects the article for various attributes, the station then returning to its starting point at a velocity greater than its inspecting velocity to pick up and track the next container presented to it. This function is performed by all three inspection stations on each article that passes through the inspection apparatus. By driving the three drive units out of phase with one another, the power needed to accelerate one unit may be furnished, in part, from the deceleration of another unit in the series drive train. Thus, the total power required to drive the apparatus is reduced and the fluctuations within the system caused by relatively high transfers of power from acceleration to deceleration is reduced, thereby allowing the operation of the system without the use of an energy storage element, such as a flywheel, to help absorb these large fluctuations in power requirements.

4 Claims, 7 Drawing Figures

INVENTOR.
DARIUS O. RIGGS

INVENTOR.
DARIUS O. RIGGS

INVENTOR.
DARIUS O. RIGGS

3,772,922

PHASE COMPENSATED MULTIPLE MOVING HEAD INSPECTION APPARATUS

BACKGROUND OF THE INVENTION

1. Field of the Invention

This invention relates generally to article inspection apparatus. More specifically, this invention relates to article inspection apparatus having moving inspection stations. Yet more particularly, this invention relates to article inspection apparatus wherein the moving article is tracked and inspected by a moving article inspection station. Most specifically, this invention relates to article inspection apparatus wherein a moving article is, in sequence, tracked and inspected by multiple moving inspection stations which are driven out of phase with one another.

2. Description of the Prior Art

In the field of inspection of glass containers, the inspection devices of the prior art have generally fallen into two classes. The first class is illustrated by devices such as that shown in U.S. Pat. No. 3,313,409. in which articles are sequentially presented to nonmoving inspection stations and rotated at the inspection station.

The second class of prior art inspection devices is illustrated by U.S. Pat. No. 2,596,342, in which a plurality of inspection heads track and inspect moving articles. This type of device is relatively limited in its application, in that the requirement of multiple identical inspection heads limits the complexity and expense of the inspection heads which may be used. All of the prior art devices are now being pressed to the limits of their capabilities by increased productivity of glass containers. It has thus been necessary to develop a new type of inspection device which will operate at higher production speeds. It has been known to track moving articles with inspection heads during an inspection cycle with the inspection head then returning to a starting position to pick up a new article to be inspected. However, such systems have required complex drive trains, have required a relatively large power input to drive them, and have been subject to wide power pulsations, due to the cyclic nature of the movement of the inspection station. The present invention is a practical multiple moving head inspection device, which has overcome all of these limitations of the prior art devices.

SUMMARY OF THE INVENTION

This invention is a method and apparatus for serially inspecting multiple moving articles. At least three inspection station driving means are placed in linear alignment. Each inspection station driving means has an oscillating shaft to which an article inspection station is drivingly connected. By the use of adjustable coupling means between the inspection station driving means, the inspection station driving means may be driven from a common power source, but may operate out of phase with one another. Thus, the power needed to accelerate one station may be obtained in part from the deceleration of another station. The articles themselves are presented to the inspection stations by a transport means and are rotated during the time of transport past the inspection stations by a rotating means.

DETAILED DESCRIPTION OF A PREFERRED EMBODIMENT

Figure 1:
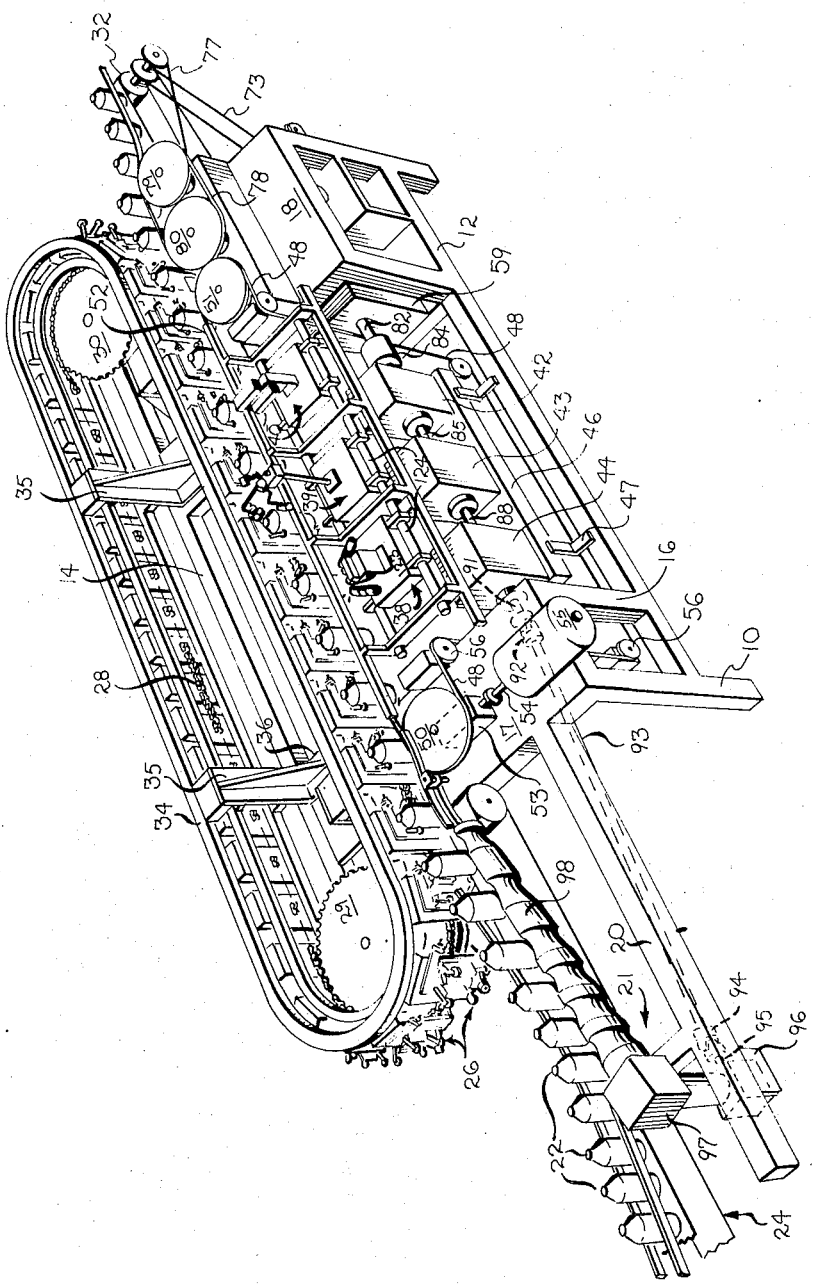
FIG. 1 is a perspective view of the apparatus of the present invention.

As seen in FIG. 1, a series of vertical legs 10 are connected by lower cross members 12, only one of which is visible in FIG. 1, and upper cross members 14 to form a supporting frame for the inspection and conveying apparatus. Vertical beams 16, in cooperation with the legs 10, serve to support an inlet table plate 17 and an outlet table plate 18, the table plates 17 and 18 being welded in place to the legs 10 and the beams 16. A cantilevered beam 20 attached to the inlet table plate 17 serves to carry a worm infeed mechanism generally designated as 21. Articles to be inspected, in this preferred embodiment glass bottles 22, are presented in single file by an input conveyor 24. The bottles 22 are spaced a preselected distance apart by the worm infeed mechanism 21. The bottles 22 thus spaced are grasped by one of a plurality of bottle chucks 26 as they leave the input conveyor 24 and carried in a manner best seen in FIG. 6. The bottle chucks 26 are all fixedly attached to an endless chain 28 which is trained around two, horizontally spaced, rotatably mounted sprockets 29 and 30. The chain 28 is driven, in a manner to be described later, thereby driving the bottle chucks 26. The net result is that bottles are transported from the input conveyor 24 to an output conveyor 32 where they are deposited for removal. A generally oval guide track 34 is carried by angle brackets 35 which are welded to horizontal cross beams 36 which, in turn, are connected to the upper cross members 14. As the bottles 22 are moved from the input to the output ends of the machine, each bottle 22 is inspected by the three moving inspection devices 38, 39 and 40. The inspection performed by devices 38 and 39 may be that shown in U.S. Pat. No. 3,356,203 which shows optical apparatus inspecting for checks or small cracks in the bottle 22 surface. The device 40 may be a glass thickness gauge such as that shown in U.S. Pat. No. 3,393,799. The use of three moving inspection devices 38, 39 and 40 is by way of example for this preferred embodiment, and more or less inspection devices could be used if desired. The three moving inspection devices 38, 39 and 40 are driven in a reciprocating path by three driving means 42, 43 and 44. The three driving means 42, 43 and 44 are preferably Ferguson Oscillating Drives manufactured by the Ferguson Machine Company, 7818 Maplewood Industrial Court, St. Louis, Mo. 63143. These drives are shown on page 14a of Ferguson Catalog No. 164, third printing. The operation of these drives is such that a continuously rotating input shaft is coupled to a cam which drives an output shaft in an oscillating motion. Thus, as will be explained later in detail, the three driving means 42, 43 and 44 will reciprocate the three moving inspection devices 38, 39 and 40. For clarity of discription, the three driving means 42, 43 and 44 will hereinafter be referred to as drive boxes 42, 43 and 44. The drive boxes 42, 43 and 44 are mounted, in line, on a channel section 46. The channel section is attached to the lower cross members 12 by support brackets 47. The control cam in each of the drive boxes is mounted on a rotatably mounted shaft which serves as both an input and an output shaft. These shafts are connected by split couplings 84, 86 and 89 in a manner best seen in FIG. 2. As the bottles 22 are carried by the bottle chucks 26, they are rotated for inspection purposes by a moving endless belt 48. The belt 48 is driven by a drive pulley 50 and trained around an idler pulley 51. A belt guide 52 serves to control the horizontal path of the endless belt 48 in the area in which it contacts and rotates the bottles 22. The driven pulley 50 is driven by a right-angle gear box 53 through a drive shaft 54 connected to a motor 55. It can be seen from FIG. 1, that the belt 48 does not pass directly from the drive pulley 50 to the idler pulley 51 on the idle side of the belt 48. Instead, the belt 48 is diverted downward, under the channel section 46, and back up again to the idler pulley 51 by a series of diverting pulleys 56. The diversion of belt 48 provides clear access to the inspection devices without danger of having a running belt become tangled with wires that will be connected to the three inspection heads or devices 38, 39 and 40.

Figure 2:
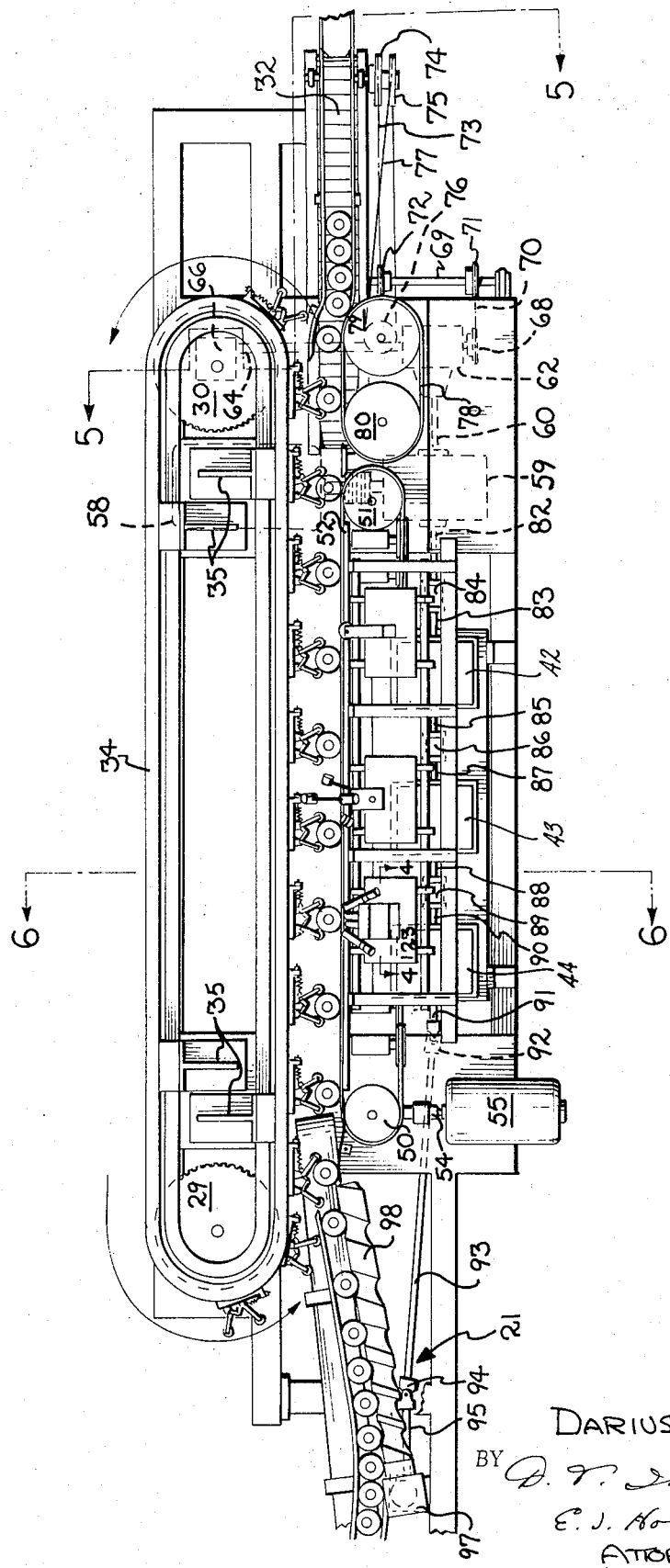
FIG. 2 is a plan view of the apparatus of the present invention.
Figure 5:
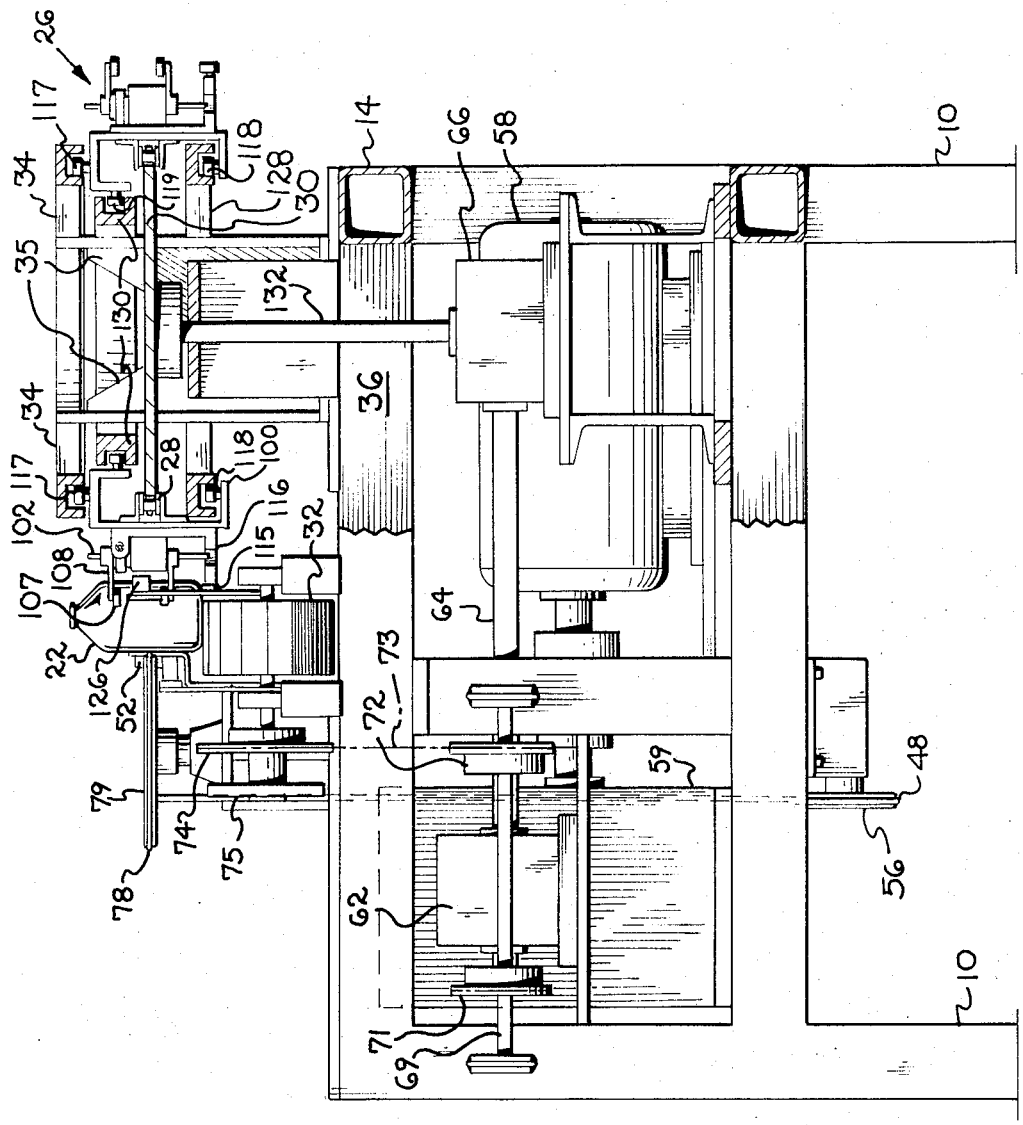
FIG. 5 is an end view, partially in cross-section, taken along the line 5—5 in FIG. 2.

With reference to FIGS. 1, 2 and 5, the power train of the entire apparatus may be clearly seen. A main drive motor 58 delivers power to a dual output gear box 59. One output shaft 60 of the gear box 59 delivers power to second dual output gear box 62. The gear box 62 through a shaft 64 drives a gear box 66 which drives the sprocket 30. A second output shaft from the gear box 62 drives a chain sprocket 68 which in turn drives a shaft 69 through a chain 70 and sprocket 71 carried on the shaft 69. A sprocket 72 carried on the shaft 69 drives the output conveyor 32 through a chain 73 and sprocket 74. A pulley 75, mounted on a common shaft with the sprocket 74, drives a pulley 76 through a twisted endless belt 77. The function of the last drive is to power a bottle antirotation belt 78. The belt 78 is trained around rotatably mounted pulleys 79 and 80, the pulley 79 being driven by the pulley 76. As the bottles 22 reach the takeout conveyor 32, the moving antirotation belt 78 helps remove the bottles 22 from the bottle chucks 26 and deposit them on the takeout conveyor 32, stopping the rotation imparted by the belt 48. Returning now to the dual output gear box 59, a second output shaft 82 is connected to the input shaft 83 of the drive box 42 through a lockable split-shaft coupling 84. The output shaft 85 of the drive box 42 is connected to the input shaft 87 of the drive box 43 through a lockable split shaft coupling 86. The output shaft 88 of the drive box 43 is connected to the input shaft 90 of the drive box 44 through a split shaft coupling 89. The output shaft 91 of the drive box 44 is connected to a universal joint 92 to drive a line shaft 93, The line shaft 93 is connected to a second universal joint 94 which drives a stub shaft 95 connected to a lower gear box 96 (best seen in FIG. 1). The lower gear box 96 is connected to and drives an upper gear box 97 which rotates a worm infeed screw 98 of the worm infeed mechanism 21.

To fully understand the significance of the drive train, several factors must be made clear at this point. The input/output shaft pairs 83 and 85, 87 and 88, and 90 and 91 are actually common shafts. That is, the input/output shaft 83 and 85 is a common shaft extending completely through the drive box 42. The ends of the shaft have been given different reference numerals for ease of description. The split-shaft couplings 84, 86, and 89 are identical and of a type well-known in the art. The characteristics of the couplings 84, 86 and 89 are such that, for example, the lockable coupling 84 may be unlocked, the shaft 82 held stationary and the shaft 83 rotated with respect to the shaft 82. This then will change the rotational phase relationship of the shafts 83 and 82. When the coupling 84 is relocked, the shaft 82 will drive the shaft 83 in the newly set phase relationship. Thus, it should be clear that all of the drive boxes 42, 43 and 44 may be set in a different phase relationship with one another, even though they are all driven in common, at the same speed, by the shaft 82 through the dual output gear box 59.

Figure 3:
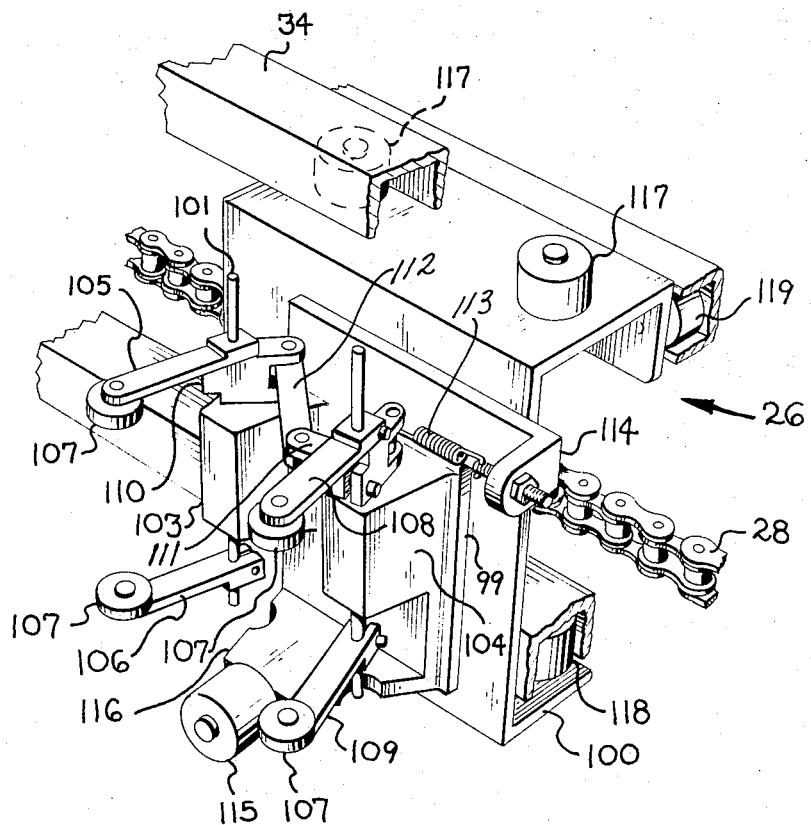
FIG. 3 is a perspective view, on an enlarged scale, of a single bottle carrying chuck.

FIG. 3 shows, in an enlarged perspective view, a single one of the bottle chucks 26. A body casting 100 is secured to and moves with the chain 28. Two vertical, arm-supporting shafts 101 and 102 are rotatably mounted in two bearing blocks 103 and 104, which blocks extend outwardly from a plate 99 and of which they are a part. The plate 99 is attached to the body casting 100. The arm-support shaft 101 has affixed to it an upper roller arm 105 and a lower roller arm 106. Nylon rollers 107 are affixed to the ends of the roller arms 105 and 106 and are free to rotate. Similarly, the arm-support shaft 102 carries upper and lower roller arms and 109, which have rotatable nylon rollers 107 mounted on their ends. The arm-support shafts 101 and 102 are connected together and operate as a unit through a linkage comprising a bifurcated link 110 attached to the shaft 101, a similar bifurcated link 111 attached to the shaft 102, and a cross link 112 connecting the two bifurcated links 110 and 111. The shafts 101 and 102 are normally biased in a closed direction by a spring 113 attached to the bifurcated link 111 and a spring holder boss 114 extending from the face of the mounting plate 99. As bottles 22 leave the input conveyor 24, they force the arms 105, 106, 108 and 109 apart and the rollers 107 are held against the bottle wall under the urging of the spring 113. The bottom of a bottle 22 is supported by a rotatable roller 115 attached to a roller plate 116 which is a lower, generally horizontal extension of the mounting plate 99. Thus, bottles 22 are cradled in the rollers 107 and on the roller 115 and will be rotated by engagement with the driven endless belt 48. Also seen in FIG. 3 are upper heeling followers 117, lower heeling followers 118 and tracking followers 119, all of which are attached to the body casting 100 and whose function may be understood in conjunction with FIG. 5.

Figure 4:
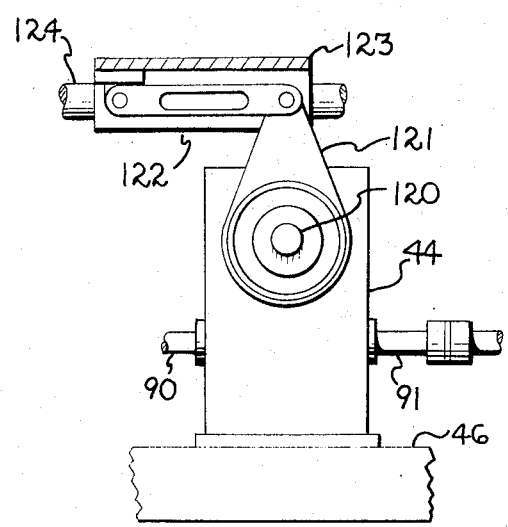
FIG. 4 is a partial-sectional view taken along the line 4—4 in FIG. 2.

FIG. 4 shows an elevational view of the drive for the inspection stations 38. An oscillating output shaft 120 of the drive box 44 is coupled to a crank 121. The crank 121 is attached to a clevis mount 122 which, in turn, is attached to a movable mounting table 123. The table 123 serves to carry the inspection apparatus for the inspection station 38. As the oscillating shaft 120 oscillates, the table 123 will be reciprocated. The table 123 is guided by guide rods 124 (best seen in FIG. 1). All of the inspection stations 38, 39 and 40 are driven in an identical manner.

With particular reference to FIG. 5, a bottle 22 is shown supported partially on the takeout conveyor 32 and partially on the roller 115. A curved removal finger 126 is positioned so as to engage behind the bottle 22 and gradually force it away from the arms 105, 106, 108 and 109 and onto the takeout conveyor 32, overcoming the holding force of the spring 116. The track 34 may now be seen to have an open U-shaped section on its underside in which the upper heeling followers 117 are trapped. In addition, there is a lower track 128 having an inverted U-shaped section in which the lower heeling followers 118 are trapped. A U-shaped intermediate track 130 serves to guide the tracking followers 119. All of the tracks 34, 128 and 130 cooperate with the followers 117, 118 and 119 to insure that the bottle chucks 26 follow a precise path. The tracks 128 and 130 are also attached to the angle brackets 35. Also visible in FIG. 5 is the shaft 132 which drives the sprocket 30 from the gear box 66.

Figure 6:
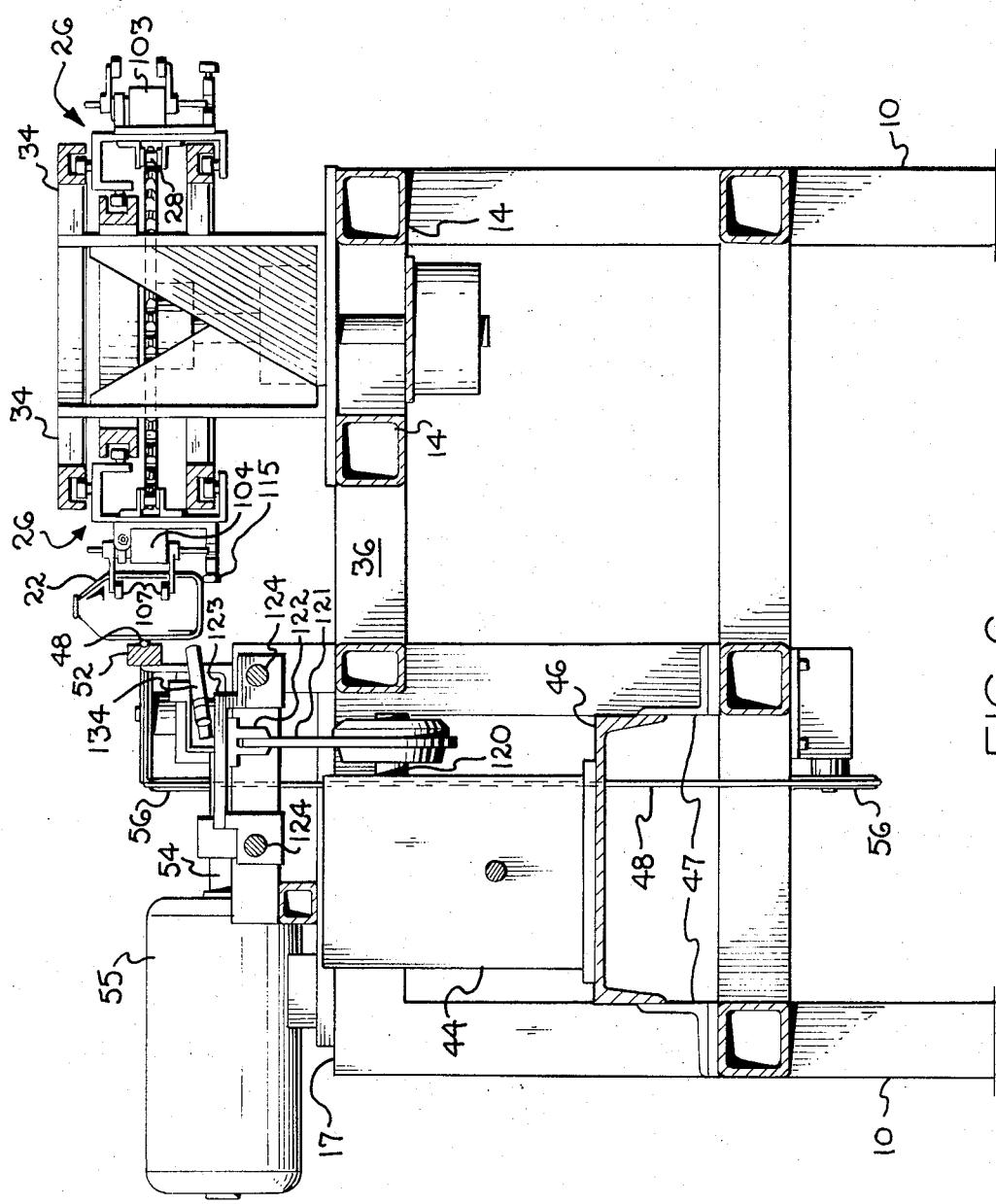
FIG. 6 is a cross-sectional view taken along the line 6—6 in FIG. 2.

FIG. 6 clearly shows how a bottle 22 may be inspected, for example for heel or bottom checks, at a typical inspection station such as inspection station 38. The bottle 22 is supported to rotate under the influence of the belt 48. Also clearly seen is the connection of the crank 121 to the clevis mount 122 for driving the table 123 along the guide rods 124. The inspection apparatus 134 mounted on the table 123 has a clear view of the bottle so as to perform its function in accord with the teachings of U.S. Pat. No. 3,356,203.

The oscillatory motion of the oscillating output shafts 120, provided by all of the drive boxes 42, 43 and 44, is identical and controlled by a cam within the drive boxes 42, 43 and 44. It must again be understood that the inspection stations 38, 39 and 40 will move with a bottle 22 being inspected, performing the inspection while moving, then stop, return to a starting position and begin to track another bottle. The motion of the oscillating output shafts 120 is such that for every 360° of rotation of the input/output shaft pairs 83–85, 87–88, and 90–91; 140° of rotation are at a constant velocity for the inspection interval (the velocity being, of course, the linear velocity of the bottle 22 being inspected), 150° of rotation is spent in returning to the starting point, 30° of rotation is spent in deceleration to match the bottle speed, and 30° of rotation is spent in decelerating to zero velocity for the start of the return stroke.

Figure 7:
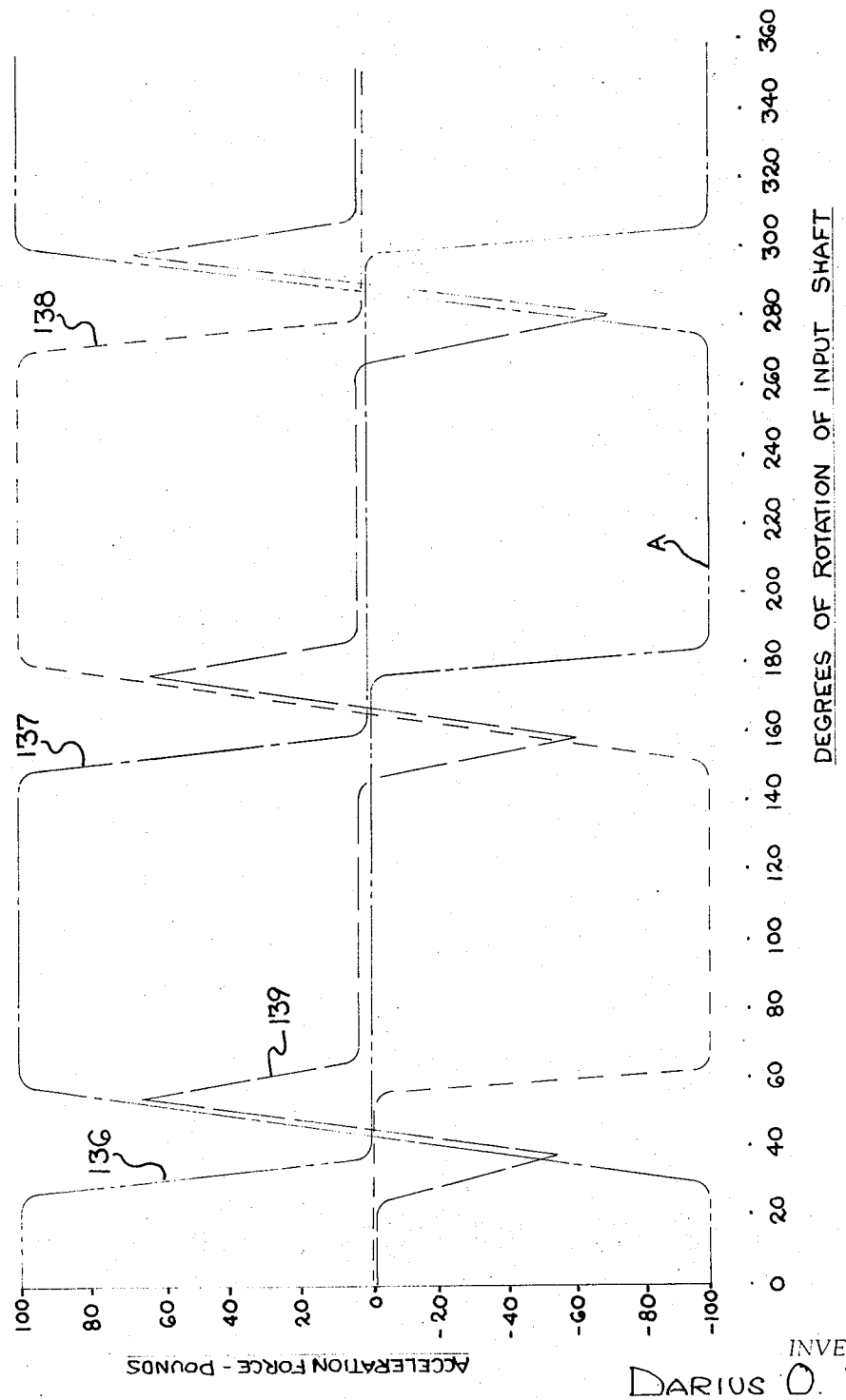
FIG. 7 is a graph of the acceleration forces vs. displacement of the three inspection heads during operation.

This operation is best seen by reference to the graph shown in the FIG. 7. The abscissa of FIG. 7 is calibrated in degrees of rotation of the main input shaft 82. The ordinate of FIG. 7 is calibrated in terms of pounds of force required for acceleration. This, of course, may easily be converted to actual acceleration values by using the fact that the weight of each of the inspection apparatus at each of the stations 38, 39 and 40 is approximately 11 pounds. It will be noted that the values of the ordinate of FIG. 7 vary from zero to +100 and from zero to −100. In this example, it is assumed that positive values are those which will give an acceleration in the direction in which the bottles 22 are moving, while a negative value will give an acceleration in the opposite direction or toward the starting position at which the inspection stations 38, 39 and 40 begin the process of inspecting the bottles 22. Thus, the positive and negative values do not indicate acceleration or deceleration per se, but rather are indicative of the direction of the acceleration or deceleration. As an example, consider curve 136 in FIG. 7. The curve 136 illustrates the cycle followed by the inspection mechanism 38 and is typical of the operational curve produced by all three of the inspection-drive boxes 42, 43 and 44. At 0°, the accelerating force component is seen to be at a maximum in the direction of the movement of the bottles 22. This acceleration component is raising the velocity of the inspection station 38 to match that of the bottle 22 moving past it. The constant force or constant acceleration continues until 26° into the cycle, at which point the velocities of the station 38 and the bottle 22 begin to match. The accelerating force component then begins to drop rapidly and by 34.6° into the cycle, it has reached zero. At this point, the inspection station 38 and the bottle 22 are moving at the same linear velocity in the same direction and the inspection process has begun. The inspection station 38 continues to move with the bottle 22 at a constant velocity for 140° or until 174.6° into the cycle. At 174.6°, a force component is introduced to retard the velocity of the inspection station 38 in the direction of bottle 22 travel, slow it to a halt, and move it back to the starting position to pick up another bottle 22 for inspection tracking. This process begins at 174.6° into the cycle. The acceleration force on the inspection station 38 reaches a maximum in the negative sense at 183.3° into the cycle. This constant maximum acceleration force in the negative direction is maintained from 183.3° to 284.6°. The velocity of the inspection station 38 reaches zero at 209.3° into the cycle at the point marked A on curve 136. Thus, since the velocity has reached zero but the accelerating force in the negative direction remains constant, the inspection station 38 is rapidly moved back to its starting position. At 265.8° into the cycle, the inspection station 38 begins to decelerate and the accelerating force begins to change from a negative accelerating force to a positive accelerating force. From the position at 265.8° into the cycle to a point 284.6° into the cycle, the negative component of acceleration dies and at 284.6° into the cycle, the accelerating force becomes positive to move to slow the inspection station 38 to a halt and then return it with a bottle 22 at a constant velocity. The positive accelerating force reaches a maximum and constant value at 303.5° into the cycle. At a point 360° into the cycle, the velocity of the inspection station 38 in the negative direction becomes zero. With the accelerating force still in the positive direction, one may pick up the motion of the inspection station 38 at 0° into the cycle, where this discussion began, and see that the inspection station 38 will then be accelerated to the speed of the bottle 22 at which point the accelerating force drops to zero and the velocity of the inspection station 38 remains constant during the 140° inspection cycle.

The graph of FIG. 7 shows the acceleration force curves of all of the inspection stations 38, 39 and 40, with curve 136, as previously explained, corresponding to station 38, curve 137 corresponding to station 39, and curve 138 corresponding to station 40. Curve 139 is a composite of curves 136, 137 and 138. It is clear that the inspection stations 38, 39 and 40 are set out of phase with one another by about 120°. This phase overlap allows the entire system to be driven with less power, since the power needed to accelerate one station is in part furnished by the deceleration of another. In addition, prior attempts to drive multiple moving inspection stations have failed because of vibrational problems imparted by the movement in phase of all of the stations. The out-of-phase movements of the multiple stations in this invention dampen out any such vibrations rather than re-enforcing them. The vast decrease in power requirements is clearly evident from FIG. 7. If a single station were driven independently, it would require 3.3 horsepower. Therefore, to drive three stations independently would require 9.9 horsepower. With the present invention, where the three stations are commonly driven, out of phase, the horsepower requirement is 0.825 to drive all three. There is, therefore, a ten-fold saving in the power required. In addition, all three drive boxes 42, 43 and 44 are driven in line from a common source. There are no complicated split-drive systems to insure that each station is driven independently. The phase relations of the inspection stations are set in an initial setup by unlocking the shaft couplings 84, 86 and 89. Then, the shafts 90, 87 and 83 are turned to set the stations 38, 39 and 40 in the phase arrangement shown in FIG. 7. With the couplings 84, 86 and 89 relocked, the stations 38, 39 and 40 will always be driven in the phase relationship shown.

I claim:

1. Apparatus for moving at least three members in a reciprocating linear path out of phase with one another comprising : individual drive means for each of said members for reciprocating said members, said drive means each having an oscillating output arm drivingly connected to said member and a rotatable input shaft and a rotatable output shaft, said oscillating output arm being driven by said input shaft, said drive means being mounted in a substantially linear array; a rotational power source connected to the input shaft of a first one of said drive means for rotating the input shaft of the first one of said drive means in said linear array of drive means; and means connecting the input and output shafts of said drive means in series for adjusting the operational phase of said drive means relative to one another.

2. The apparatus of claim 1, wherein said means for adjusting the operational phase of said drive means relative to one another comprises lockable split shaft couplings connecting said input and output shafts in series.

3. Apparatus for reciprocating at least three members from a single power source comprising: a variable speed rotary drive; a first drive means having a single rotary input and dual oscillatory and rotary outputs for driving a first one of said members; a first adjustable means for coupling said variable speed rotary drive to the input of said first drive means; a second drive means having a single rotary input and dual oscillatory and rotary outputs for driving a second one of said members, a second adjustable means for coupling the rotary output of said first drive means to the rotary input of said second drive means; a third drive means having a single rotary input and dual oscillatory and rotary outputs for driving a third one of said members; a third adjustable means for coupling the rotary output of said second drive means to the input of said third drive means; means for coupling the oscillatory output of each of said first, second and third drive means to individual members to be reciprocated; and means for restraining said members to a linear path of travel, said adjustable means connecting said drive means being adjusted such that said drive means are substantially 120° out of phase with each other, whereby the power requirement to drive the members is substantially less than the power to drive a single member.

4. Method of reciprocating three members from a single power source comprising the steps of: coupling a variable speed rotary drive to a first single rotary input dual oscillatory and rotary output drive means; coupling the rotary output of said first drive means to the rotary input of a second single rotary input dual oscillatory and rotary output drive means; coupling the rotary output of said second drive means to the rotary input of a third single rotary input, dual oscillatory and rotary output drive means; coupling the oscillatory output of each of said first, second and third drive means to individual members to be reciprocated; restraining the motion of said members to linear reciprocation; and setting the relationship between said rotary inputs and rotary outputs substantially 120° out of phase with each other, whereby the power required to drive the members is reduced to a level less than the power to drive a single member.

* * * * *